April 24, 1956 E. P. FELCH ET AL 2,743,367

FREQUENCY MULTIPLIER APPARATUS

Filed April 23, 1953

INVENTORS: E. P. FELCH
F. G. MERRILL
BY W. J. O'Neill
ATTORNEY

United States Patent Office 2,743,367

Patented Apr. 24, 1956

2,743,367

FREQUENCY MULTIPLIER APPARATUS

Edwin P. Felch and Francis G. Merrill, Chatham, N. J., assignors to Bell Telephone Laboratories, Incorporated, New York, N. Y., a corporation of New York Application April 23, 1953, Serial No. 350,702

5 Claims. (Cl. 250—36)

Figure 1:
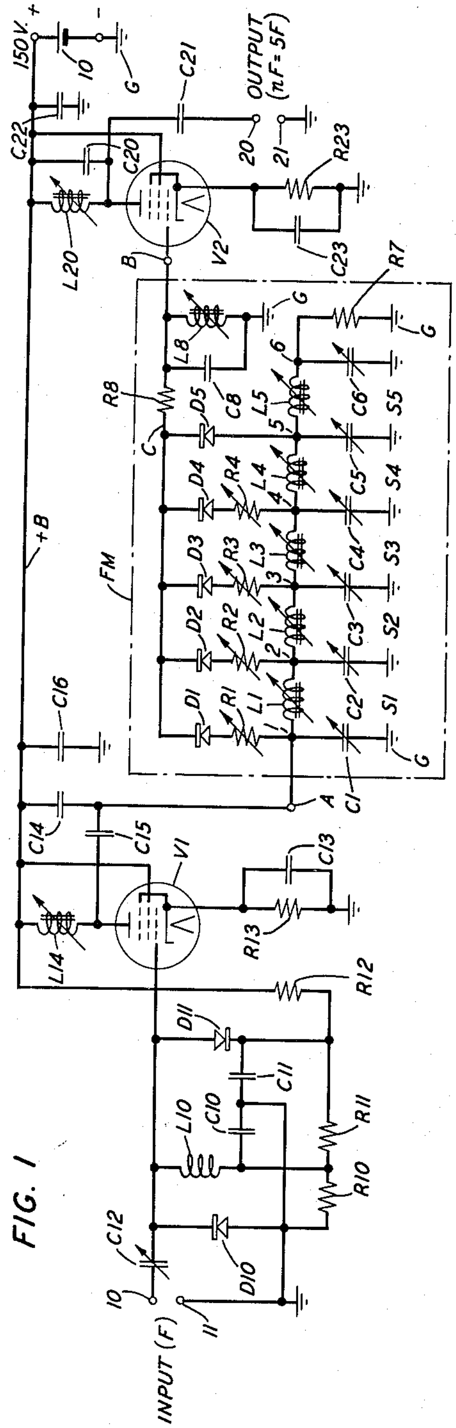

This invention relates to frequency multiplier apparatus, and particularly to frequency multiplier apparatus of the phase shift type which may be utilized to multiply an applied input or fundamental sine wave of frequency F to a substantially sine wave output harmonic multiple thereof of frequency *n*F, where *n* may be any harmonic value of the applied input frequency F according to the number of phase shifted waves selected from each cycle or wavelength of the applied fundamental input wave.

One of the objects of this invention is to provide a phase shift type frequency multiplier.

Another object of this invention is to provide such a frequency multiplier having reduced losses and other advantages, particularly where factors of increased frequencies and increased frequency multiplication may be involved.

Another object of this invention is to provide a frequency multiplier which will have a substantially linear input-output amplitude level relationship over a reasonable range of input amplitude level.

Another object of this invention is to provide a frequency multiplier which will generate odd harmonic multiples of the input frequency, particularly in combination with the previous objectives.

Another object of this invention is to provide a frequency multiplier in which the particular desired harmonic frequency output is accentuated with respect to unwanted harmonic outputs.

Conventional frequency multipliers for multiplication ratios of three or greater usually employ distorting devices such as overloaded or overbiased electron tubes or varistors to produce a distorted wave-form containing the desired harmonic which may be selected by means of an output tuned circuit or filter. Since, in such distortion type multipliers, the fundamental and adjacent frequency products may be present in the output circuit at a level equal to or above that of the desired harmonic product, the output filter used therewith usually must be made to afford a relatively high order of discrimination. This may involve the use of such high effective Q's or such large multiple filter sections as to result in a relatively steep phase versus frequency characteristic, a characteristic which may not be compatible with optimum phase stability, particularly in cases where the filter is operated out of a saturated electron tube. The phase shift type of frequency multiplier apparatus provided in accordance with this invention may avoid this difficulty by synthesizing a wave which contains predominantly the desired harmonic and which consequently may require only a minimum of filtering to eliminate unwanted products.

In accordance with this invention, an input wave of frequency F, to be multiplied to the desired harmonic frequency *n*F, may be applied to one end of a phase shift type transmission line, such as a lumped constant iterative network type line or a distributed constant line, and may be synthesized by adding the peaks of waves therein successively shifted in phase with respect to the phase of the original applied input frequency wave or signal. In this arrangement, the unitary phase shift type transmission line may be utilized to provide the separate phase shifted waves or signals; and diodes, varistors or other suitable unilateral conductive devices connected to appropriate tap points on the phase shift transmission line may be utilized to tap off and select at any instant the phase shifted wave or signal of greatest amplitude and pass it to a common output circuit.

Accordingly, as a feature of this invention, an iterative phase shift type of transmission line such as an iterative phase shift lumped constant line comprising a tandem series of phase shifting network sections or an iterative phase shift distributed constant line comprising a tandem series of phase shifting line sections may be utilized to obtain therein the desired number of phase shifted signals which may be tapped off therefrom, rectified and combined in the common output load circuit.

Also, as an additional feature of this invention, one or more additional phase shift sections may be provided at the end of the phase shift transmission line beyond the last rectifier tap point thereon, and utilized as impedance termination means therefor and also as means for adjusting the uniformity of the output wave.

Also, as additional features of this invention, resistors may be provided between any or all of the respective junction tap points on the phase shift transmission line and their associated respective rectifiers to compensate for differences in level of current supplied to the common output circuit; and the output load circuit may be made of relatively high impedance compared with the impedance of the phase shift transmission line in order to equalize the signals, minimize distortion of the line currents, and for other purposes.

The present invention provides a frequency multiplier which is relatively simple to construct and operate, and which gives an output frequency that is an odd or even multiple *n*F of its applied input or fundamental frequency F and that is substantially free from the latter frequency F.

Figure 3:
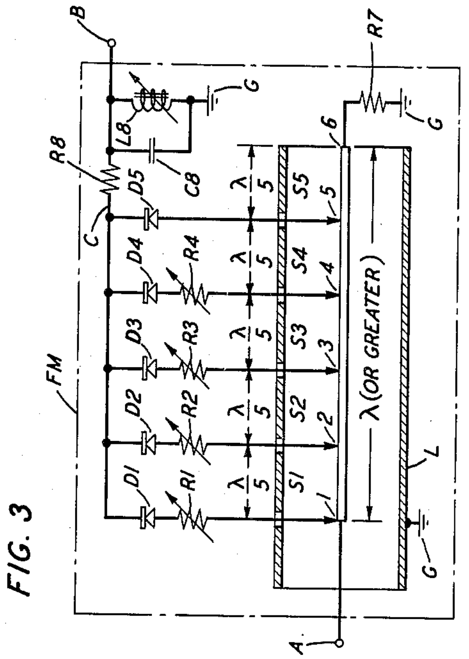
Figure 2:
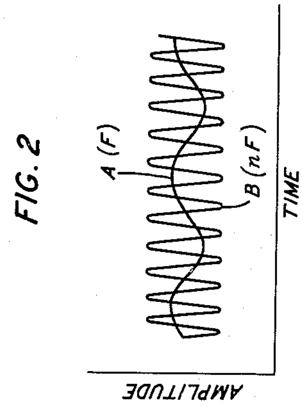
Figure 2A:
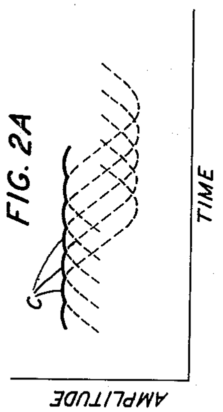

For a clearer understanding of the nature of this invention and the additional advantages, features and objects thereof, reference is made to the following description taken in connection with the accompanying drawings, in which like reference characters represent like or similar parts and in which:

Fig. 1 is a schematic circuit diagram illustrating a phase-shift type frequency multiplier apparatus in accordance with this invention, wherein the applied sine wave input frequency F may be multiplied to an output substantially sine wave harmonic frequency *n*F which, in the example illustrated in Fig. 1, involves a harmonic value of $nF=5F$;

Fig. 2 is a graph illustrating an example of input and output wave forms for the frequency multiplier circuit shown in Fig. 1, curve A of Fig. 2 representing an input sine wave of frequency F as applied at point A to the input of the frequency multiplier in Fig. 1, and curve B of Fig. 2 representing an output sine wave of harmonic frequency $nF=5F$ as obtained at point B from the output of the frequency multiplier in Fig. 1;

Fig. 2A is a graph illustrating the wave forms at points 1 through 5 of Fig. 1 and also at C of Fig. 1, the solid-line curve C of Fig. 2A representing the wave shape at C of Fig. 1 and the dotted and solid-line curves of Fig. 2A representing the composite of waves at points 1 through 5 of Fig. 1; and Fig. 3 is a circuit diagram illustrating a modification in the form of the phase shift transmission line comprising a phase shift line of the distributed constant type, instead of an iterative phase shift network of the lumped constant type, as shown in Fig. 1.

Referring to the drawing, Fig. 1 is a circuit diagram illustrating a phase shift type frequency multiplier apparatus, showing particularly a quintupler form thereof adapted to frequency multiply an applied input or fundamental sine wave frequency F as illustrated by the curve A in Fig. 2, to an output sine wave harmonic multiple frequency $nF=5F$ as illustrated by the curve B in Fig. 2.

As particularly shown in Fig. 1, the circuit may generally comprise an input circuit source of frequency F including an amplifier V1 and its associated tuned input and output circuit components which may be of any suitable form, a phase shift type frequency multiplier FM having its input A connected to the tuned output circuit of the input amplifier V1 and having its tuned output B connected to the input of an output load circuit amplifier V2 which may be of any suitable form. The frequency multiplier part FM of the apparatus illustrated in Fig. 1 has its input between the input terminal A thereof and ground G, and its output terminals between the output terminal B thereof and ground G.

As shown in Fig. 1, the input circuit for the frequency multiplier FM may comprise an input source of sine waves of frequency F applied at input terminals 10, 11 and connected through a coupling condenser C12 to the input of a suitable pentode type amplifier tube V1. The tube V1 may be provided with a suitable control grid input circuit resonant network which may include therein a tuning inductor L10 and capacitors C10, C11 tuned to the input frequency F, and voltage peak limiters comprising varistors or germanium crystal diodes D10, D11 connected to form a clipper circuit which may be utilized to insure constant maximum voltage. As shown in Fig. 1, the plate circuit for the amplifier tube V1 may comprise a resonant network, including a tuning inductor L14 and capacitors C14, C15, which may be tuned to the input frequency F and utilized to transform the impedance in the plate circuit of the tube V1 for use at the input terminal A of the unitary phase shift transmission line S1 to S5 of the frequency multiplier FM. The plate and screen supply voltages for the amplifier tubes V1 and V2 may be obtained from a suitable +B power supply source 10.

As particularly shown in Fig. 1, the phase shift transmission line of the frequency multiplier FM may comprise a unitary or undivided lumped constant type line consisting of a plurality of three-mesh phase-shifting iterative network sections S1 to S5 comprising series inductors L1 to L5 and shunt capacitors C1 to C6. In this arrangement, each of the phase shift sections S1 to S5 may contribute a successive phase shift of one-fifth cycle or 72 degrees of the applied input frequency waves and thereby provide at the successive five junction tap-off points 1 to 5 thereon five waves of the input frequency F each having a relative successive phase shift of one fifth (one *n*th) of one cycle or wavelength of the applied input frequency wave.

Accordingly, in the particular case of the quintupler example shown in Fig. 1, five individual voltages each differing in phase by 72 degrees or one fifth of one cycle of the input frequency wave F applied at A, may be obtained from the five respective junction tap points 1 to 5 located on or between the respective phase-shifting network sections S1 to S5, and such voltages may be adjusted to equal or uniform magnitude by means of the associated respective series resistors R1 to R4 to compensate for line losses and other effects and then individually applied to their associated five respective half wave crystal diodes or other suitable rectifiers D1 to D5, the resistors R1 to R4 being utilized to adjust the relative amplitude levels of the respective voltages individually supplied to the five respective rectifiers D1 to D5.

Each of the five rectifier diodes or varistors D1 to D5 conducts as the voltage applied thereto becomes greater than that of the others and since there are, in the quintupler example shown in Fig. 1, five such rectifiers D1 to D5, there will be five successive pulses supplied at the common output circuit line C of the rectifiers D1 to D5 for each cycle or wavelength λ of the input wave applied at input A to the phase shift transmission line S1 to S5. These five pulse type waves, which may be made nearly equal and sinusoidal, represent the outputs of the five half-wave polyphase rectifiers D1 to D5 and may be combined in the common output or load circuit at C which may be connected to the output terminal B of the frequency multiplier FM, through a series resistor R8 and a tuned circuit comprising a parallel-connected tuning inductor L8 and capacitor C8 having a relatively high Q for wave shaping purposes. The resistor R8 may be utilized to prevent the phase shift transmission line S1 to S5 from shunting the output circuit resonant network L8, C8, and may be made of relatively high resistance values, roughly the same as the tuned impedance of network L8, C8, such as of an impedance value of some ten times higher than the impedance of the phase shift transmission line S1 to S5, in order to prevent loading the latter and destroying its transmission line characteristics.

As shown in Fig. 1, the output terminal B of the frequency multiplier FM may be applied to the input or control grid circuit of the output amplifier V2 which may be a pentode type vacuum tube provided with a tuned plate circuit consisting of a parallel-connected tuning inductor L20 and capacitor C20, and utilized to step down the impedance into the final output circuit load terminals 20, 21. The tuned input and output circuits L8, C8 and L20, C20 for the amplifier tube V2, being tuned to the desired output harmonic frequency *n*F, may also provide additional filtering of the pulse type waves applied thereto from the outputs of the rectifiers D1 to D5.

As shown in Fig. 1, the phase shift transmission line S1 to S5 may be provided with end termination means in the form of one or more additional or end network sections, such as the termination or end phase shift network section S5 shown in Fig. 1 as comprising a series inductor L5 and a shunt capacitor C6 and also shunt resistor R7, all disposed beyond the last or end junction tap point 5 connected to the last rectifier D5 and which, in accordance with a feature of this invention, may be utilized to adjust the uniformity of the output wave.

Adjustments in the multiplier circuit of Fig. 1 may be made with the aid of an oscilloscope and a voltmeter. With the voltmeter connected to the input of the frequency multiplier line between the terminal A and ground G, and with an input signal F sufficiently low that the limiter D10, D11 is inoperative, the input frequency network L10, C10, C11 and L14, C14, C15 may be tuned for maximum voltage at A into the frequency multiplier transmission line S1 to S5. Curve A of Fig. 2 illustrates the input frequency F voltage waveform with the limiter D10, D11 working. Then with the oscilloscope connected to the common output point C of the rectifiers D1 to D5, adjust the inductors and capacitors L1 to L5 and C1 to C6 of the phast shift transmission line S1 to S5 for pulses of equal amplitude and phase, using the resistors R1 to R4 to compensate for differences in level. This is illustrated in Fig. 2A. After these adjustments are made as well as possible, the voltmeter may be connected to the output terminals 20, 21 and the output circuit networks L8, C8 and L20, C20 for the tube V2 may be tuned for maximum voltage. Curve B of Fig. 2 illustrates the output frequency *n*F voltage wave form as compared with the input frequency F voltage wave form of curve A, the frequency components in curve B being fifth harmonics of the input frequency F shown in curve A.

As an illustrative example in a particular case for the quintupler form of frequency multiplier as illustrated in Fig. 1 and wherein the input frequency F is assumed to be a sine wave frequency $F=1$ megacycle per second as illustrated by curve A of Fig. 2 and wherein the harmonic output frequency $nF$ is substantially a sine wave frequency $nF=5$ megacycles per second as illustrated by curve B in Fig. 2, the circuit of Fig. 1 may have the following component values approximately. The input and output circuit amplifier tubes V1 and V2 may be conventional 401A type pentodes, or other suitable amplifiers. The rectifiers D1 to D5, D10 and D11 may be any suitable rectifier means as varistors or crystal diodes. The resistors for the present example may have resistance values of the following approximate values as expressed in ohms: R1=470, R2=360, R3=240, R4=120, R7=510, R8=4700, R10=2160, R11=2160, R12=100,000 and R13=1500. The capacitors for the present example may have capacitance values of the following approximate values as expressed in micro-microfarads: C1 to C5 each=480 to 520, C6=230 to 270, C8=68, C10 and C11 each=1000, C12=7 to 45, C13=100,000, C14=560, C15=330, C16=1000, C20=50, C21=18, C22=250,000 and C23=680. The inductors for the present example may have the following approximate inductance values as expressed in microhenries: L1 to L5 each=72 to 80, L8=13 to 15, L10=1, L14=80 to 100, L20=13-15. The one megacycle per second fundamental input frequency F in the example given above, may be at a 75 ohm input at 0.05 volt, and the five megacycle per second harmonic output frequency $nF$ may be into a 75 ohm output at 0.5 volt at the output terminals 20, 21.

While the particular frequency multiplier circuit of Fig. 1 is by way of illustrative example shown as a quintupler, as for multiplying a one megacycle per second input frequency F to a five megacycles per second output frequency $nF=5F$, it will be understood that other values of input frequencies F and other values of frequency multiplication of ratios $n$ may be utilized by the use of suitable circuit values therein.

Also, while the phase shift transmission line S1 to S5 of Fig. 1 is shown therein as comprising network sections of series inductors L1 to L5 and shunt capacitors C1 to C6, it will be understood that other forms of lumped constant phase shift transmission lines may be utilized comprising phase shifting network sections each of at least two of inductance, capacitance and resistance elements, such as network sections of capacitance and resistance elements for example for use at the lower frequencies; and that other forms of phase shift transmission lines comprising phase shifting sections of a distributed constant type transmission line may be utilized at the higher frequencies, as illustrated in Fig. 3 for example.

Fig. 3 is a circuit diagram illustrating a modification of the invention utilizing a phase shift transmission line comprising a distributed constant type line L having phase shifting sections S1 to S5, instead of a phase shift transmission line of the lumped constant type shown in Fig. 1.

As illustrated in Fig. 3, the line L may be of the coaxial conductor type having junction tap points 1 to 5 at appropriate points spaced along the electrical length thereof to provide the desired number of phase shift sections therein corresponding to the phase shifted waves to be applied to the respective rectifiers D1 to D5 the outputs of which are combined in the common output line C, as in Fig. 1. As shown in Fig. 3, the electrical length of line L is at least one wave length $\lambda$ corresponding to the fundamental input frequency F applied thereto from the input terminal A, the phase shifted signals being tapped off from the respective junction tap points 1 to 5 thereof to provide at output B the desired harmonic output frequency $nF=5F$ in the particular quintupler example illustrated in Fig. 3, and the operation being similar to that described in connection with Fig. 1.

While in Figs. 1 and 3 the phase shift transmission line is shown provided with junction tap points 2 to 5 between each of the individual phase shift sections S1 to S5, it will be understood that the junction tap points may be placed between alternate or others of the phase shift sections made of suitable number and phase shift therebetween to provide the desired harmonic of the fundamental input wave applied thereto.

Although this invention has been described and illustrated in relation to specific arrangements, it is to be understood that it is capable of application in other organizations and is therefore not to be limited to the particular embodiment disclosed.

What is claimed is:

1. Frequency multiplier apparatus comprising a source of input frequency sine waves, and means for frequency multiplying said source input frequency sine waves to harmonic output frequency waves thereof of sine wave form comprising a phase shift transmission line connected adjacent one end thereof to said source and comprising a plurality of iterative tandem-disposed phase shift sections each having a reactance value sufficient for contributing successive phase shifts in said input frequency waves therein in accordance with the order of said harmonic of said output frequency waves and corresponding in phase shift to an integral fraction of one cycle of said input frequency waves, a plurality of junction tap connection points for at least some of said phase shift sections for individually tapping off said successive phase shifted waves from said phase shift transmission line, a plurality of rectifier means individually connected to said respective junction tap points for rectifying said successive phase shifted waves received from said phase shift transmission line, means including a common output load circuit connected to and combining the outputs of said rectified waves received from said respective rectifier means for obtaining in said output circuit said desired harmonic output frequency waves, termination means for said phase shift transmission line adjacent the other end thereof comprising at least one of said phase shift sections disposed beyond the last one of said junction tap points, and resistance means individually connected in series between at least some of said junction tap points and their said respective rectifier means for controlling the relative amplitude levels of said phase shifted waves therein, said output load circuit including therein a series resistance means connected with said plurality of rectifier means and having a substantially higher impedance value than the over-all impedance value of said phase shift transmission line, said output load circuit including a resonant circuit connected with said last mentioned series resistance means and tuned substantially to said desired harmonic output frequency.

2. Frequency multiplier apparatus comprising a source of input frequency sine waves including electronic amplifier means having resonant input and output circuits tuned substantially to said input frequency, and means for frequency multiplying said input frequency waves to desired harmonic output frequency waves of substantially sine wave form comprising a phase shift transmission line connected adjacent one end thereof to said tuned output circuit of said amplifier means and comprising a plurality of iterative tandem-disposed phase shift sections each having a reactance value sufficient for contributing successive phase shifts in said input frequency waves therein in accordance with the order of said harmonic of said output frequency waves and each corresponding in phase shift to an integral fraction of one cycle of said input frequency waves, junction tap connection points for at least some of said successive phase shift sections for individually tapping off said successive phase shifted waves from said phase shift transmission line, terminating means for said phase shift transmission line adjacent the other end thereof comprising at least one of said phase shift sections disposed beyond the last one of said junction tap points, a plurality of rectifier means individually connected to said respective junction tap points for rectifying said successive phase shifted waves received from said phase shift transmission line, resistance means individually connected in series between at least some of said junction tap points and their said respective rectifier means for substantially equalizing the relative differences in amplitude levels of said successive phase shifted waves therein, means including a common output circuit connected to and combining the outputs of said rectified waves received from said respective rectifier means for obtaining in said output circuit said desired harmonic output frequency waves, said output circuit including therein a series resistance means connected with said plurality of rectifier means and having a sufficiently high impedance value with respect to the impedance value of said phase shift transmission line to prevent said output circuit from shorting said phase shift transmission line and to equalize said desired harmonic frequency waves in said output circuit and minimize distortion of currents in said transmission line, said output circuit including therein a resonant circuit connected with said last-mentioned series resistance means and tuned substantially to said harmonic output frequency for filtering said desired harmonic frequency sine waves therein, and output circuit electronic amplifier means having the input thereof connected to said last-mentioned resonant circuit and having an output resonant circuit tuned substantially to said harmonic frequency for amplifying and further filtering said desired harmonic frequency sine waves therein.

3. Frequency multiplier apparatus in accordance with claim 2 wherein said phase shift transmission line comprises a lumped constant type transmission line, and said reactance of each of said phase shift sections thereof comprises a combination of at least two of inductance, capacitance and resistance elements.

4. Frequency multiplier apparatus in accordance with claim 2 wherein said phase shift transmission line comprises an iterative phase shift network having at least three-tandem-connected phase shift three-mesh type network sections comprising series inductors and shunt capacitors, and wherein said end terminating network section comprises a shunt resistor.

5. Frequency multiplier apparatus in accordance with claim 2 wherein said phase shift transmission line comprises a terminated coaxial conductor type line, and said phase shift sections thereof comprise sections along the electrical length of said line individually connected to said respective junction tap connection points thereon.

References Cited in the file of this patent

UNITED STATES PATENTS

| | | |
|---|---|---|
| 1,514,735 | Schriven | Nov. 11, 1924 |
| 2,263,376 | Blumlein et al. | Nov. 18, 1941 |
| 2,273,163 | Wilson | Feb. 17, 1942 |
| 2,401,405 | Bedford | June 4, 1946 |
| 2,414,541 | Madsen | Jan. 21, 1947 |
| 2,465,840 | Blumlein | Mar. 29, 1949 |
| 2,485,124 | Westcott | Oct. 18, 1949 |
| 2,589,254 | Hoeppner et al. | Mar. 18, 1952 |